(12) United States Patent
Smith et al.

(10) Patent No.: US 7,233,839 B2
(45) Date of Patent: Jun. 19, 2007

(54) INSERTION CONTROL

(75) Inventors: Scott J. Smith, Fremont, NE (US); Jeffery G. Nowlin, Council Bluffs, IA (US); Jay E. Greene, III, Nebraska City, NE (US); Mark T. Tonack, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 11/333,950

(22) Filed: Jan. 17, 2006

(65) Prior Publication Data
US 2006/0116788 A1    Jun. 1, 2006

Related U.S. Application Data

(60) Division of application No. 10/949,009, filed on Sep. 23, 2004, now Pat. No. 7,013,199, which is a continuation of application No. 10/108,189, filed on Mar. 26, 2002, now Pat. No. 6,804,576.

(51) Int. Cl.
G06F 7/00 (2006.01)

(52) U.S. Cl. .............. 700/220; 700/213; 270/58.06

(58) Field of Classification Search ........... 700/213, 700/220, 222, 241; 270/58.06
See application file for complete search history.

(56) References Cited

U.S. PATENT DOCUMENTS

| | | | |
|---|---|---|---|
| 4,835,544 A | 5/1989 | Winterburn | |
| 5,056,767 A | 10/1991 | Emigh et al. | |
| 5,144,562 A | 9/1992 | Stikkelorum et al. | |
| 5,915,690 A * | 6/1999 | Surya | 271/265.01 |
| 6,240,334 B1 | 5/2001 | Duke et al. | |
| 6,370,445 B1 | 4/2002 | Olson et al. | |
| 6,418,357 B1 | 7/2002 | Chodack et al. | |
| 6,804,576 B2 * | 10/2004 | Smith et al. | 700/220 |
| 6,813,870 B2 * | 11/2004 | Iwamoto | 53/460 |
| 6,823,237 B1 * | 11/2004 | Bodie | 700/223 |
| 7,013,199 B2 * | 3/2006 | Smith et al. | 700/222 |
| 2002/0038235 A1 * | 3/2002 | Musafia et al. | 705/11 |

OTHER PUBLICATIONS

Pitney Bowes, Direct Connect Inserter Control System, downloaded from website http://www.pb.com.

* cited by examiner

Primary Examiner—Khoi H Tran
(74) Attorney, Agent, or Firm—Townsend and Townsend and Crew LLP

(57) ABSTRACT

According to the invention, an insertion system for collating sheets of printed material for insertion into an envelope is disclosed. The insertion system includes an insertion machine, application software and an operating system. Included in the application software is a first function and a second function, where the first function performs tracking for each packet and the second function controls operation of the insertion machine. Each packet includes a plurality of pieces of printed material that may ultimately be sealed in an envelope. The operating system runs the application software at any given instant and executes the first and second functions.

5 Claims, 8 Drawing Sheets

INSERTION CONTROL

This application is related to and incorporates by reference the following: U.S. patent application Ser. No. 10/045,589, filed Nov. 8, 2001; U.S. patent application Ser. No. 10/036,653, filed Nov. 8, 2001; and U.S. patent application Ser. No. 10/081,167, filed Feb. 22, 2002.

BACKGROUND OF THE INVENTION

This invention relates in general to insertion machines and, more specifically, to automation of operation and management of insertion machines.

Insertion machines are used to prepare mailings and/or sort paperwork. In certain industries such as customer billing and direct mailings, insertion machines may stuff a maximum of about 13,000 envelopes per hour. The material in these envelopes can be customized for each recipient, as is the case with bills. An operator of the insertion machine is tasked with assuring that the envelopes are stuffed with the proper material. Tracking may be performed on the envelopes and an operator of the insertion machine.

BRIEF DESCRIPTION OF THE DRAWINGS

The present invention is described in conjunction with the appended figures.

Figure 1:
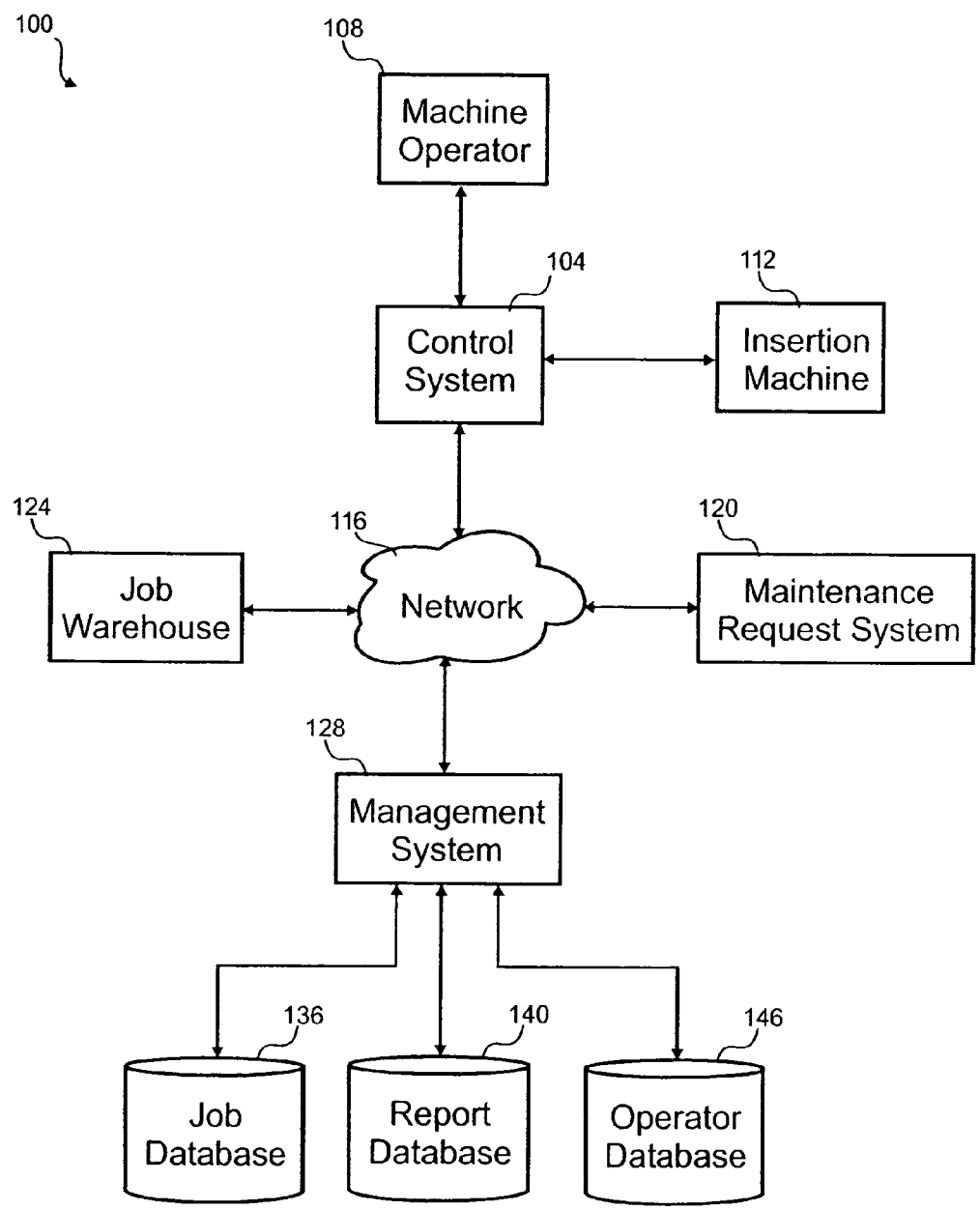
FIG. 1 is a block diagram of an embodiment of an insertion system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention provides methods and apparatuses for collating sheets of printed material for insertion into an envelope. In one embodiment an insertion system for collating sheets of printed material for insertion into an envelope is disclosed. The insertion system includes an insertion machine, application software and an operating system. Included in the application software is a first function and a second function, where the first function performs tracking for each packet and the second function controls operation of the insertion machine. Each packet includes a number of pieces of printed material that may ultimately be sealed in an envelope. The operating system runs the application software at any given instant and executes the first and second functions.

In another embodiment, an insertion system for collating pieces of printed material for insertion into an envelope is disclosed. The insertion system includes an insertion machine, an insertion control function for controlling operation of the insertion machine, a job tracking function for tracking each packet through the insertion machine, and an operating system for running application software. Each packet includes a number of pieces of printed material. The application software performs the insertion control and job tracking functions and is executed with the operating system.

In yet another embodiment, a method for inserting pieces of printed material into an envelope with an insertion machine running an operating system is disclosed. In one step, functions of the insertion machine are monitored while it operates. Functions of the insertion machine are commanded while it operates. A number of pieces of printed material are tracked through the insertion machine while it operates, where at least two of number of pieces are correlated to different envelopes. The operating system performs the commanding of the functions of the insertion machine and the tracking of pieces through the insertion machine.

Referring first to FIG. 1, a block diagram of an embodiment of an insertion system 100 is shown. The insertion system gathers pieces of printed material; performs any further processing of those pieces; collates the pieces into packets; stuffs the packets into envelopes; seals, meters and further imprints the envelopes; stores information about a insertion job and operator; and requests maintenance for an insertion machine 112. Other tasks are also performed as discussed further below. A machine operator 108 manages operation of the insertion system for a particular insertion job. Included in the insertion system 100 are a control system 104, a job warehouse 124, a maintenance request system 120, and a management system 128 interconnected with a network 116. The control system interfaces manages the insertion machine 112 with guidance from the machine operator 108. The management system 128 tracks information relating to the insertion process in a job database 136, a report database 140 and an operator database 146. Although these are shown as separate databases, they could be combined or divided in any combination as is well known in the art.

The machine operator 108 interacts with the control system 104 to perform an insertion job. The various jobs are stored on the job database 136 and can be selected by the operator 108. Each piece in the job is referenced and a digitized picture is stored for display. The pieces are loaded and checked before the operator 108 begins insertion. During the insertion process, the operator 108 monitors the insertion machine 112 and fixes simple problems like misfeeds.

The insertion machine 112 serially takes the pieces from a number of piece inserters as the track passes each piece inserter to form a packet of pieces. In this embodiment, 3,000 to 20,000 packets are run through the insertion machine 112 per hour. Each piece inserter is coupled to a track position. As the track moves from position to position, the pieces that form the packet are added to the track. Some embodiments could have multiple tracks that gather sub-packets for combination into a larger packet. An envelope is started down a parallel track where it is opened for insertion of the packet. The envelope can sealed and possibly metered and further imprinted before sorting. After sealing, a diversion conveyor belt may receive the envelope if the job tracking function noted a problem with the envelope or its contents. These defects can be fixed by the operator 108. Some embodiments use one or more diversion conveyor belts to sort the envelopes that are still tracked at this point. In various embodiments, the envelopes may or may not be sealed for a whole job or selectively for certain envelopes in the job.

The control system 104 manages operation of portions of the insertion system 100. A user interface on the control system 104 facilitates performance of four main functions, namely, tracking the operator 108, control of the insertion machine 112, tracking of the insertion job as it is performed, and maintenance requests for the insertion machine 112. More specifically, the control system 104 tracks counts of pieces, packets and envelopes; tracks operator efficiency; tracks insertion machine 112 set-up; tracks the movement of the insertion machine 112 through its cycle; provides job-specific information; manages the weight of pieces, packets and envelopes; provides piece-level reporting for each packet; logs events; checking of the sequencing of the envelope build; and other quality checking. The piece-level reporting allows noting how each envelope was built and if anything was missed for that envelope. This embodiment of the control system 104 performs at least the job tracking and machine control on a single computer system. That is to say, a single operating system running on a computer system runs application software to perform these tasks. Some embodiments also perform the operator tracking and maintenance requests on the same operating system. In one embodiment, the computer system is a single or multiple-processor personal computer running a Microsoft Windows™ operating system such as Windows NT.™ Other embodiments could use different operating systems and/or arrays of computers working under the control of a single operating system.

The network 116 provides interconnection between sub-systems of the insertion system 100. In various embodiments, the network 116 could include one or more of: a wired LAN or WAN, a wireless LAN or WAN, an Internet connection, etc. Various sub-systems may be in the same or different buildings or could even be in different geographic locals. Further various sub-systems could be combined or separated into other arrangements in the various embodiments.

The pieces and their precursors for the insertion job are stored in the job warehouse 124. The precursors could include rolls where the pieces are cut from, printed or unprinted pieces that will get further printing, embossed or unembossed cards, etc. Some piece inserters will finish the precursors or the precursors could be finished by other systems. The job warehouse 124 receives electronic or manual requests for the pieces or precursors for a particular job as specified in the job database 136. If an operator 108 or the control system 104 determines a particular piece inserter is running low, the operator 108 can make a manual request or the control system 104 can make an automatic request for more pieces or precursors. In some embodiments, the finished product from the insertion process is returned to the job warehouse 124 for distribution.

A maintenance request system 120 receives maintenance requests for the various sub-systems. The operator 108 can manually enter requests or the control system can automatically recognize problems and make requests. Servicing and diagnostic issues are also recorded with the maintenance request system 120 along with usage information that could trigger preventative maintenance. The operator 108 or control system 104 may shut down the insertion machine 112 when a request is made if further operation is not advisable.

A management system 128 tracks insertion jobs and the operators 108. Insertion jobs are designed prior to production of the job and entered into the management system 128. The management system may regulate broader aspects of producing mailings, beyond the insertion task. A computer system, such as an IBM AS/400™ is used for the management system 128. Some embodiments may have a number of control systems and insertion machines in various locations. The management system 128 can be used by all or some of these other control systems and insertion machines.

There are three databases 136, 140, 146 coupled to the management system 128. The job database 136 coupled to the management system 128 holds the particulars on jobs. Information such as the pieces and envelope involved; digitized pictures of the pieces and envelope; the further processing for those pieces or envelopes; customization for pieces, packets and envelopes; unique identifiers for customized pieces or envelopes; weight of the individual pieces and envelopes for metering postage of the aggregate; and special handling instructions are stored in the job database 136. After completion of a job, the particulars for each envelope and its contents are stored in the report database 140 and/or a log file. Any problems are recorded in the report database 140 along with the remedial action taken to correct the problem for each envelope in a job. An operator database 146 stores the start/stop/pause times for the insertion machine 112 of the operator 108 along with the productivity of that operator 108 while operating the insertion machine 112. Productivity includes the time taken to insert a number of envelopes, the maintenance calls requested, and complexity of the job, etc. Payroll related hours worked for the operator 108 may also be stored. In this embodiment, operator evaluations can be based upon the information in the operator database 146.

Figure 2:
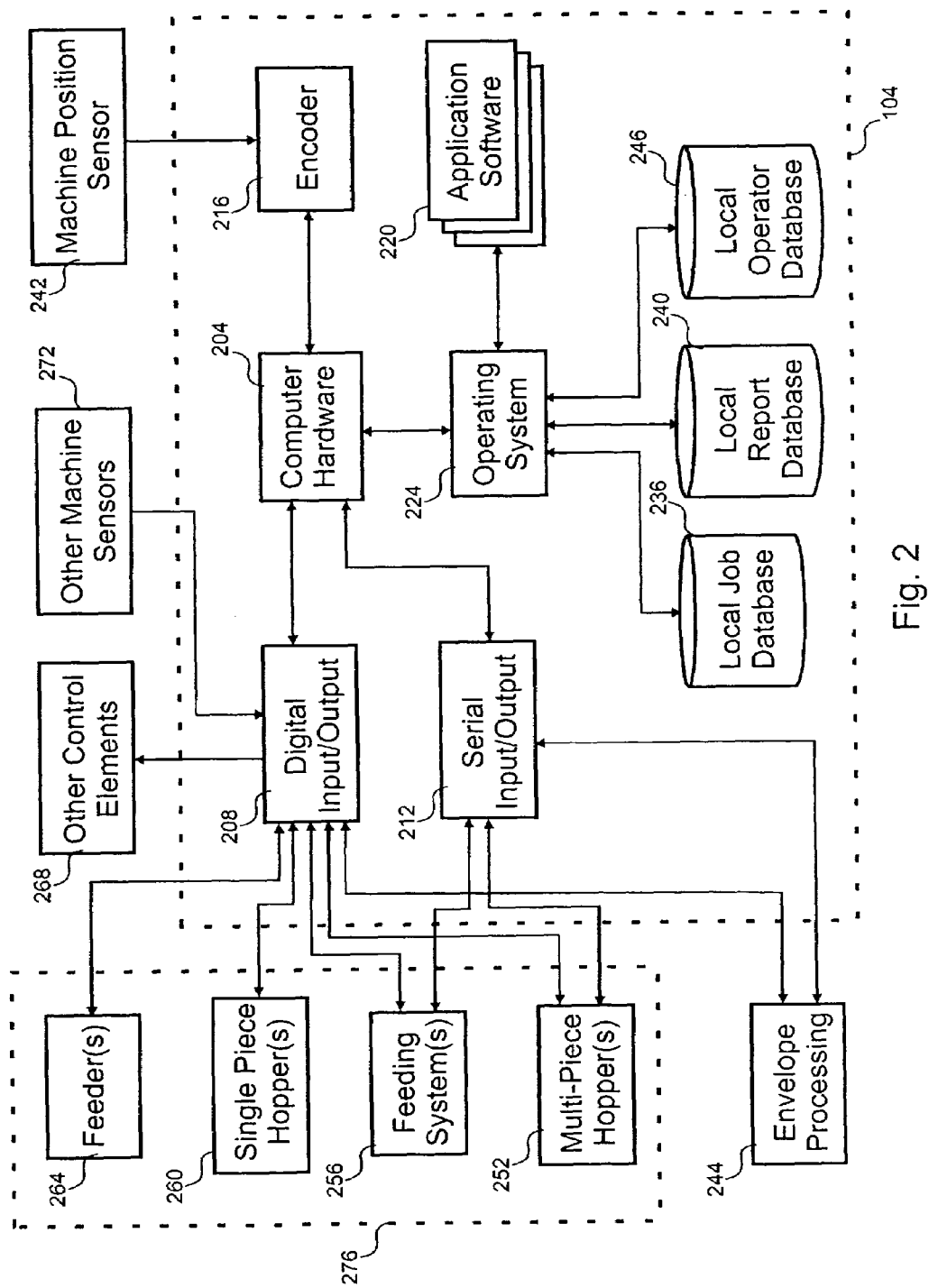
FIG. 2 is a block diagram of an embodiment of a control system interacting with portions of an insertion machine.

With reference to FIG. 2, a block diagram of an embodiment of a control system 104 interacting with portions of an insertion machine 112 is shown. In this embodiment, the control system 104 manages operation of the insertion process for each envelope, manages the operation of the insertion machine 112, tracks the interaction between the operator 108 and the insertion machine 112, and detects and reports maintenance issues. Included in the control system 104 are computer hardware 204, an encoder 216, a digital I/O card 208, a serial I/O card 212, an operating system 224, application software 220, a local job database 236, a local report database 240, and a local operator database 246. Portions of the insertion machine 112 interfaced to the control system 104 are also shown in FIG. 2 and include a machine position sensor 242, an envelope processing function 244, various piece inserters 276, other control elements 268, and other machine sensors 272.

The encoder 216 interacts with a machine position sensor 242 to determine the position of the tracks of the insertion machine 112. By knowing the position of the track, the location of the packet or envelope with respect to the piece inserters 276 or other machinery can be determined. Each piece, packet and envelope can be tracked during processing to know when errors have occurred. Envelopes improperly filled can be diverted to a separate conveyor for fixing. Further, the insertion machine 112 can be stopped if packets are being formed improperly.

Computer hardware 204 interfaces with the various components of the insertion machine 112 to perform the insertion process. The encoder 216, digital I/O function 208 and serial I/O function 212 can be off-the-shelf expansion cards that are modular and plug into the computer hardware 204. In one embodiment, the computer hardware is a single processor personal computer running a non-real time operating system 224 called WindowsNT,™ but other embodiments could use other operating systems. Application software 220 and databases 136, 240, 246 run with the operating system 224 to allow program control and data storage. The application software 220 runs in a single operating environment set forth by the operating system 224. The computer hardware 204 includes a network interface to the other components in the insertion system 100.

The interfaces to the insertion machine 112 are through the encoder 216, digital I/O function 208 and serial I/O function 212. The values produced by the encoder 216 change asynchronously with respect to the computer hardware 204. This embodiment encodes the positions of the various tracks of the insertion machine 112 by sampling the encoder periodically. Binary values are both sampled and produced by the digital I/O function 208. The digital outputs can actuate various actuators, solenoids or otherwise command sub-systems into functioning, and the digital inputs sample signals produced by the various sub-systems. For example, a vacuum actuator could be commanded by a digital output to fire such that a piece is pulled from an inserter 276, whereafter an optical sensor produces a signal for the digital input that indicates the piece was actually pulled. The serial I/O function 212 is used to communicate serially with the various sub-systems using protocols such as RS-422 and RS-232, for example. With the serial I/O function 212 binary or ASCII messages are passed to, for example, read a bar code or print an address on an envelope. The digital inputs 208 and the serial inputs 212 can trigger interrupts to synchronously read out these values.

Local databases 236, 240, 246 are maintained by the operating system 224 and application software 220. These local databases 236, 240, 246 store information specific to the control system 104 and insertion machine 112 that is updated constantly while events occur in the loading process. The records in these local databases 236, 240, 246 are archived in the global databases 136, 140, 146 associated with the management system 128 upon finishing an insertion job. After archiving, the local databases 236, 240, 246 may be deleted or stored as space constraints allow. Further the information in the local databases 236, 240, 246 could be combined in less than three databases or divided among more than three databases as is well known in the art.

This embodiment has one or more of the following types of piece inserters 276: a multi-piece hopper 252, a single piece hopper 260, a feeder 264, and a feeding system 256. Fifty-five piece inserters 276 are used in this embodiment, but other embodiments could use up to ninety-nine piece inserters 276 to stuff each envelope with pieces and/or sub-packets. The different piece inserters 276 have various configurations of bar code readers, sensors, actuators, and programmable logic controllers that serve to fold and/or imprint the pieces, pull one or more pieces, read codes from the pieces, organize multiple-pieces in a sub-packet, and/or otherwise interact with the pieces to assure they are tracked and placed on the track properly. Tracking of the pieces or sub-packets is done by reading bar codes, magnetic markers or other indicia of a specific piece or sub-packet.

The four types of piece inserters 276 of this embodiment perform slightly different tasks. The multi-piece hopper tower 252 produces a sub-packet of multiple-pieces while only using one position on the track. In contrast, a single-piece hopper 260 produces a single piece per track position. Feeding systems 256 further process the material from the warehouse 124 to produce the pieces. Such a feeding system 256 may cut statements from a roll before collating and folding the multiple pages of the statement. Other feeding systems 256 may emboss credit cards or print further information on the pieces. Feeders 264 are used to add specialty pieces, such as cards stuck to a paper backing, to the packet on the track. For example, new credit cards are often processed by a feeder 264.

The envelope processing system 244 takes the packets and stuffs them into a respective envelope. The envelope is sealed and possibly weighed, metered, and further imprinted. Any envelopes that the control system 104 determines may have a problem is diverted to a separate conveyor belt for remedial action. Those envelopes that are produced satisfactorily are stacked and returned to the job warehouse for distribution.

Depending on the configuration of the insertion machine 112 and the tasks to be performed by the insertion machine 112 other control elements 268 and/or machine sensors 272 can be used. These control elements 268 could include actuators and solenoids to flip envelopes, fold pieces, or perform other processing for a particular insertion job specified by the management system 128. Other machine sensors 272 could be used, for example, to make sure no piece(s) is pulled from a track position that is supposed to be empty or weigh the packet at various times to make sure excess material was not pulled. There are many variations possible to configure insertion machines 112 for various jobs.

Figure 3:
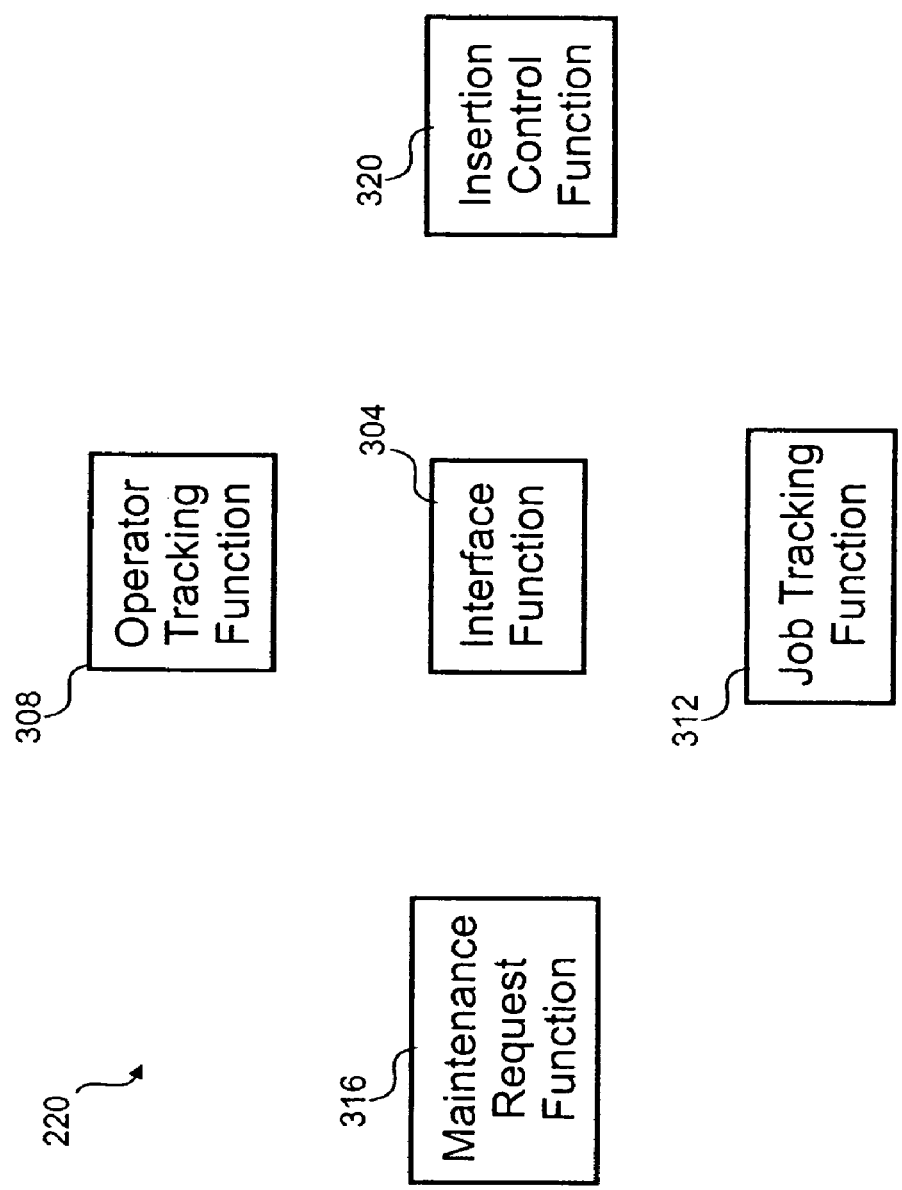
FIG. 3 is a block diagram of an embodiment of application software that runs on an operating system associated with the control system.

Referring next to FIG. 3, a block diagram of an embodiment of application software 220 is shown that runs on an operating system 224 associated with the control system 104. This embodiment of the application software 220 includes five main functions, namely, an interface function 304, an operator tracking function 308, a job tracking function 312, a maintenance request function 316, and an insertion control function 320. These functions may be divided among any number of applications running on the operating system 224. Further, additional functions and applications could also run on the operating system 224.

The interface function 304 is used by the operator 108 to interact with the control system 104. The operator 108 enters logs into the system 100, enters job information, starts/stops/pauses the insertion machine 112, makes maintenance requests, enters other information using the screens associated with the interface function 304. Functionality and customizations to the control system 104 can be done by modifying the interface function 304 along with other applications 220.

The operator tracking function 308 allows monitoring the performance of the operator as well as securing the insertion system 100 from unauthorized use. The operator logs into the system such that identity is authenticated and future interaction can be attributed back to the operator. Starting, stopping, pausing the insertion machine as well as maintenance calls are recorded and stored in the operator database 146. The quantity of insertions done over time are also recorded. With this information, productivity determinations are possible.

The job tracking function 312 provides a record of the processing on the pieces and the envelopes they are inserted into. Tracking of pieces with codes that are read during insertion allows knowing where those pieces were inserted. If desired, the codes can be tracked to a particular envelope and/or recipient account. For pieces without machine readable codes, sensors can confirm that a single piece was inserted. Weighing of the packet and/or pieces can also confirm only a single piece was inserted. Job tracking allows for the quality control such that any mistakes can be identified and remedied. The job tracking data is initially stored in the local report database 240 during processing and copied to the global report database 140 after processing of the job is complete.

Certain maintenance issues are performed by the maintenance request function 316. The routine maintenance triggered by the usage of the insertion machine can be automatically requested by the maintenance request function 316 as the triggering milestones are met. Other repair conditions that can be detected by the maintenance request function can be reported to the maintenance request system 120 automatically. In some cases a wizard process or form may request further information from the machine operator 108 to confirm or diagnose a potential repair condition. For example, the operator 108 can use a form to specify issues, such as a cutter problem, an envelope stuffing problem, a paper folding problem, a computer problem, etc. For some repair conditions, the operator 108 relied upon to recognize them. In this embodiment, a form or wizard process allows requesting maintenance in a standard way to ease diagnosis and repair.

The insertion function 320 provides machine control of the insertion machine 112. Pieces are pulled and tracked; solenoids and actuators are triggered; motors are started and stopped; tracks are advanced; envelopes are stuffed, further imprinted and metered; and subsystems are communicated with in a process which inserts pieces into the envelopes. This control function 320 manages the operation of the insertion machine to allow it to perform its task. In this embodiment, the insertion control function application 320 is run on a consumer-grade operating system such as WindowsNT,™ which is not a real-time operating system. Other embodiments could use a real-time operating system.

Figure 4:
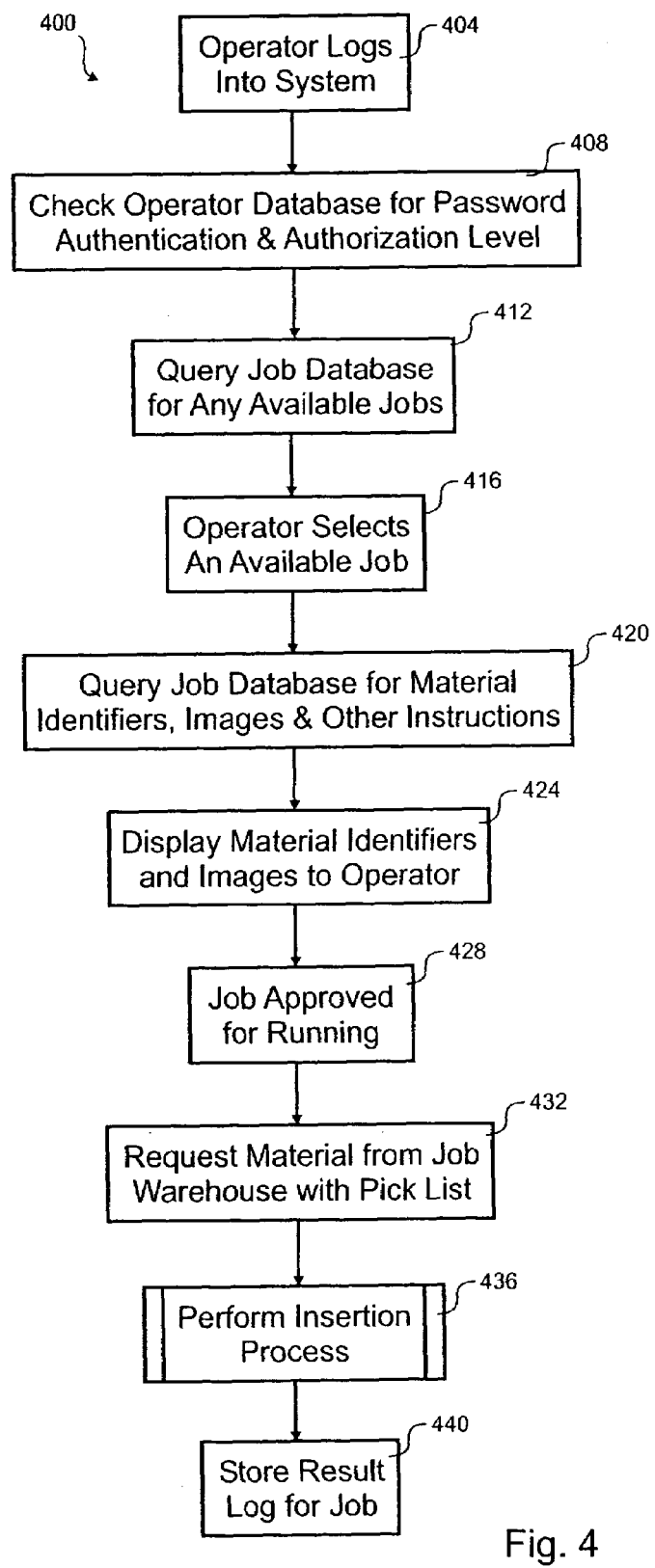
FIG. 4 is a flow diagram of an embodiment of a process for inserting packets into envelopes.

With reference to FIG. 4, a flow diagram of an embodiment of a process 400 for inserting packets into envelopes is shown. The depicted portion of the process 400 begins in step 404 where the operator 108 logs into the system 100 using the operator tracking function 308. In step 408, the operator tracking function 308 checks the local or remote operator database 246, 146 to authenticate the user name and password and to determine the authorization level of the operator 108. Some actions require a junior operator 108 to get authorization from a supervisor. Once the operator 108 is logged into the system 100, the available insertion jobs in the job database 136 can be viewed in step 412 for possible selection of an insertion job in step 416.

Once a job is selected, particulars for that job are retrieved from the job database 136 for storage in the local job database 236 in step 420. The particulars include material identifiers, images, piece weights, stuffed envelope weight, machine readable codes, and other information and instructions. Material identifiers, images and other particulars are available to the operator 108 in step 424 for viewing during set-up of the job. In step 428, the operator 108 and/or the supervisor approve the job for running. The operator may manually or the control system may automatically request the material for the job from the warehouse 124 from a pick list in step 432.

At some point during the set-up, the operator 108 configures the piece inserters and other portions of the insertion machine 112 for the specified insertion job. This may include indicating to the insertion function 320 which piece inserters 276 will be at which track positions, the type of piece inserter 276 at that track position, the pieces that will be pulled from a particular piece inserter, the type of processing to be performed on the envelope, etc. Wizards or forms from the interface function 304 can ease this task while performing certain rule checking on the information input. For example, the form may not allow a configuration that doesn't assign each piece or sub-packet to an inserter 276 or may not allow assigning a particular piece to an incompatible inserter 276.

In step 436, the insertion process is performed as described in relation to FIG. 5 below. After completion of the insertion job, the results are stored in the global report database 140 and the operator database 146 in step 440. The information may or may not be purged from the corresponding local databases 240, 246. Other embodiments may forgo local databases 236, 240, 246 altogether in favor of retrieving and storing data directly from the global databases 136, 140, 146.

Figure 5:
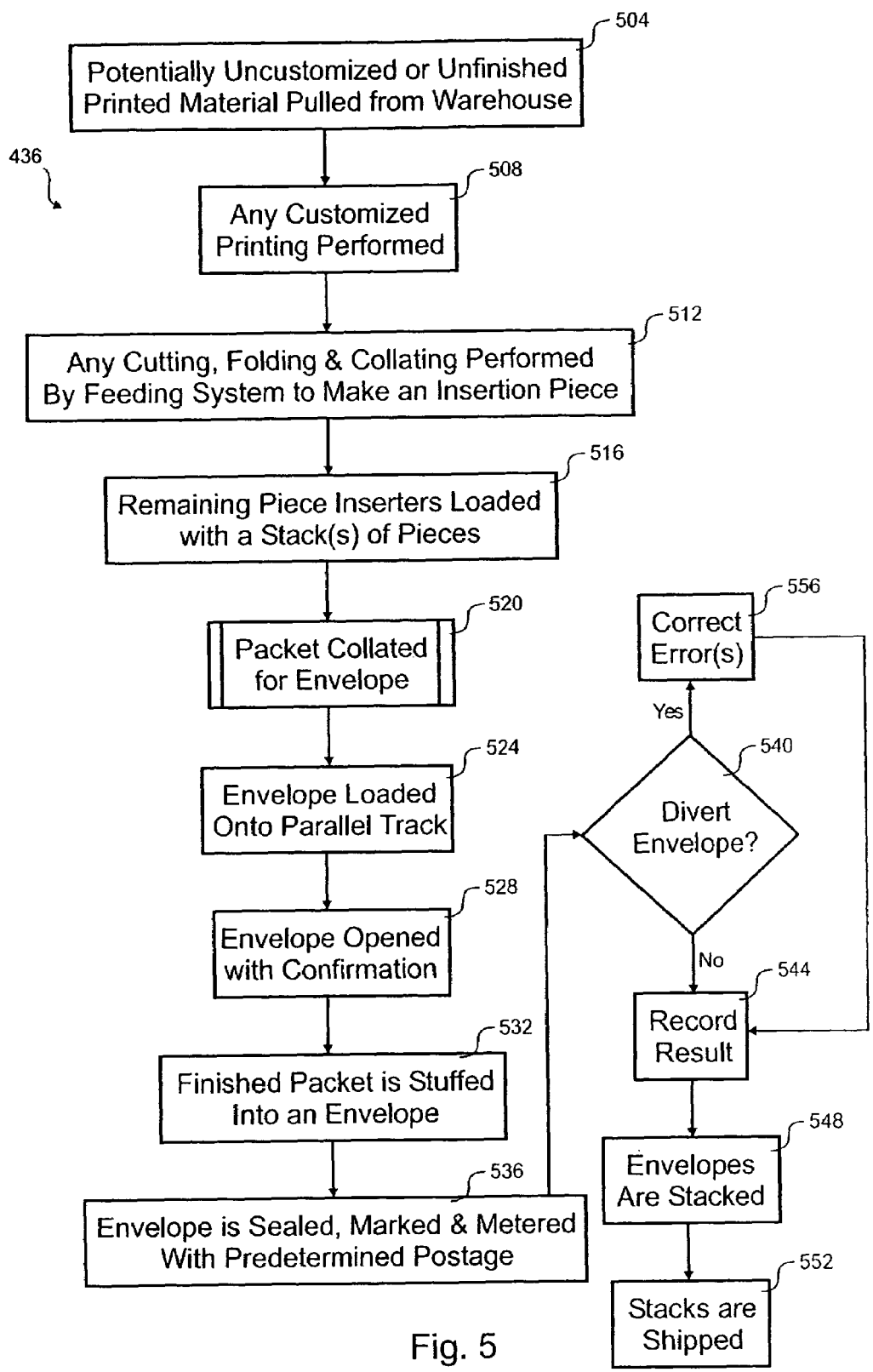
FIG. 5 is a flow diagram of an embodiment of a process for performing the insertion.

Referring next to FIG. 5, a flow diagram of an embodiment of a process 436 for performing the insertion is shown. The depicted process begins in step 504 where potentially uncustomized or unfinished material is pulled from the warehouse 124. In step 508, customized printing may be performed to the material. Further processing in the form of cutting, folding and collating performed by feeding system 256 to form a insertion piece or sub-packet in step 512. In step 516, the remaining piece inserters 276 are loaded with pieces. It is noted that there are typically a number of piece inserters 276 for a loading job and they may have any number of configurations to perform various processing of the various pieces. Further some of the additional processing of the pieces may be performed before or during the insertion processes 436. For example, rolls of statements could be cut, printed and collated before insertion to produce sub-packets, or a multi-piece hopper could collate and fold inserts during and in synch with the insertion process 436.

In step 520, the packet is formulated for a particular envelope as further described in relation to FIG. 6 below. Once the packet is gathered from the various piece inserters 276, the envelope is pulled from another inserter 276 in step 524 and loaded onto a track moving parallel to the packet destined for the envelope. In step 528, the control system activates a vacuum to open the envelope flap and an optical sensor verifies the envelope was opened. The envelope is stuffed with the packet with result proceeding on one of the tracks in step 532. In step 536, the envelope is sealed, further imprinted and metered, if specified, in the envelope processing section 244. The postage can be determined by calculating the sum of the envelope and the packet inside. This weight could also be measured in some embodiments or the weight could serve as a quality control check that would indicate the wrong number of inserts in an envelope.

During the loading process, errors may be detected by the job tracking function 312 for a particular envelope. Errors could include an improper weight, the envelope flap not opening, a piece not being pulled, too many pieces being pulled, or a piece being pulled where there is no piece inserter 276, etc. If the error is serious enough to require rework as determined in step 540, the piece is diverted to another conveyor belt to correct the errors in step 556.

Where the envelope passes without error or where any errors are corrected, the result is recorded along with other information about the envelope and its contents in the local report database 240 in step 544. Some embodiments may only record errors detected instead of data on each envelope. The envelopes are stacked in step 548. Those stacks may be temporarily stored in the job warehouse 124 or may be directly shipped or mailed in step 552.

Figure 6:
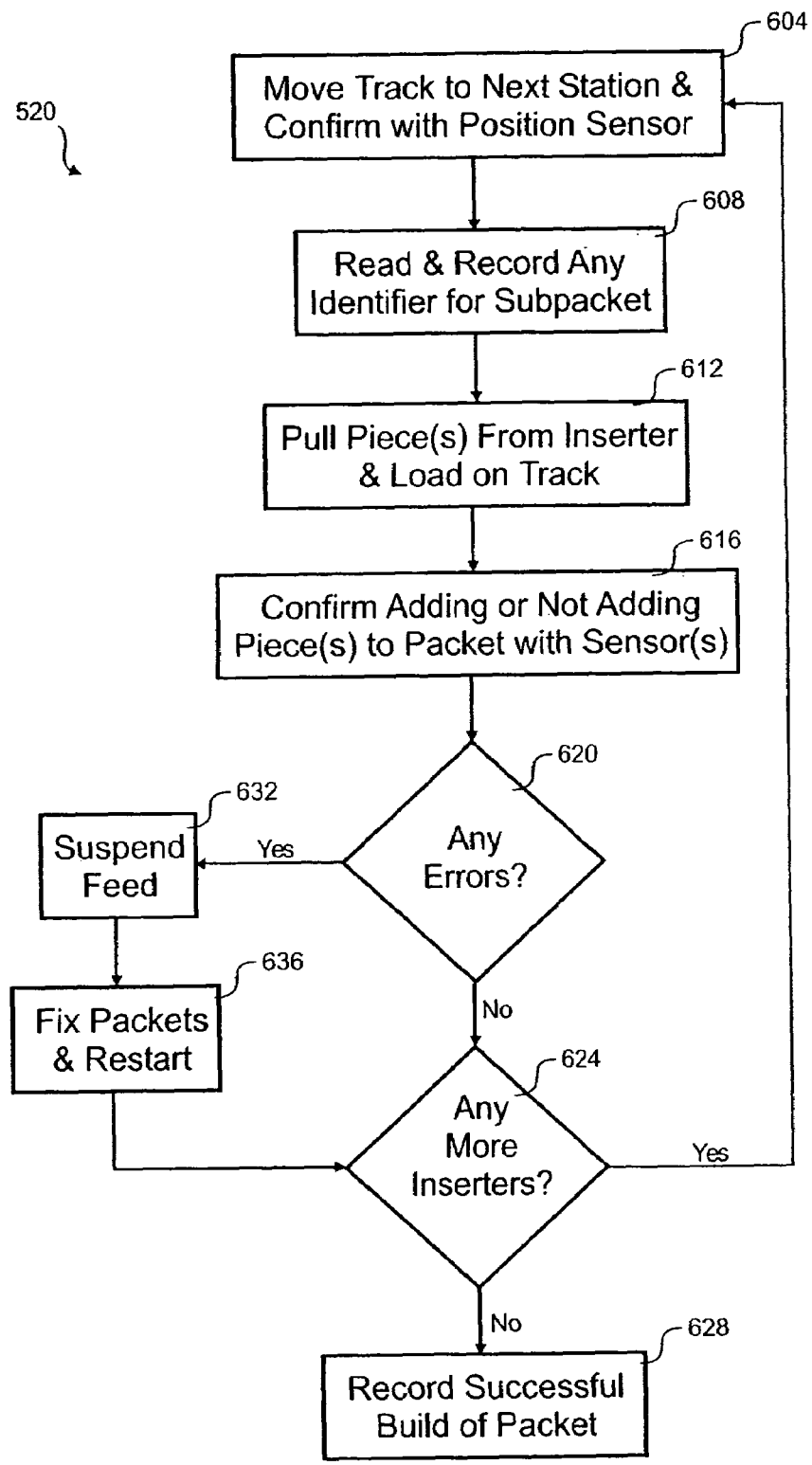
FIG. 6 is a flow diagram of an embodiment of a process for gathering pieces of printed material for the packet.

With reference to FIG. 6, a flow diagram of an embodiment of a process 520 for gathering pieces of printed material for the packet is shown. The process begins in step 604 where the track is moved to the next piece inserter station. The signal from the position sensor 242 is encoded to let the control system 104 confirm that the track has moved. Any machine readable code on the piece or sub-packet is read in step 608 using a bar code reader, for example. The value read is passed to the serial I/O function 212 for the computer hardware to process 204.

The piece or sub-packet is pulled and loaded onto the track in step 612. In some embodiments, the piece inserter 276 may be further processing the material as it is pulled. A sensor input is sampled by the digital I/O function 208 to indicate to the computer hardware 204 whether a piece or sub-packet was pulled in step 616. Further confirmation in some embodiments is performed by weighing the packet. In some cases, the insertion machine 112 may sense an error in step 620 that is best fixed by suspending the track feed in step 632. The packets affected could be fixed in step 636 along with anything wrong with the insertion machine 112 that may have been causing the problem. If there are no more track positions with inserters 276 as determined in step 624, the result of the packet build is recorded in step 628. Where there are more pieces to insert, processing loops back to step 604 in a cycle until all pieces are moved to the track to form the packet. At any given moment in this embodiment, there are around twenty packets in various stages of completion.

Figure 7:
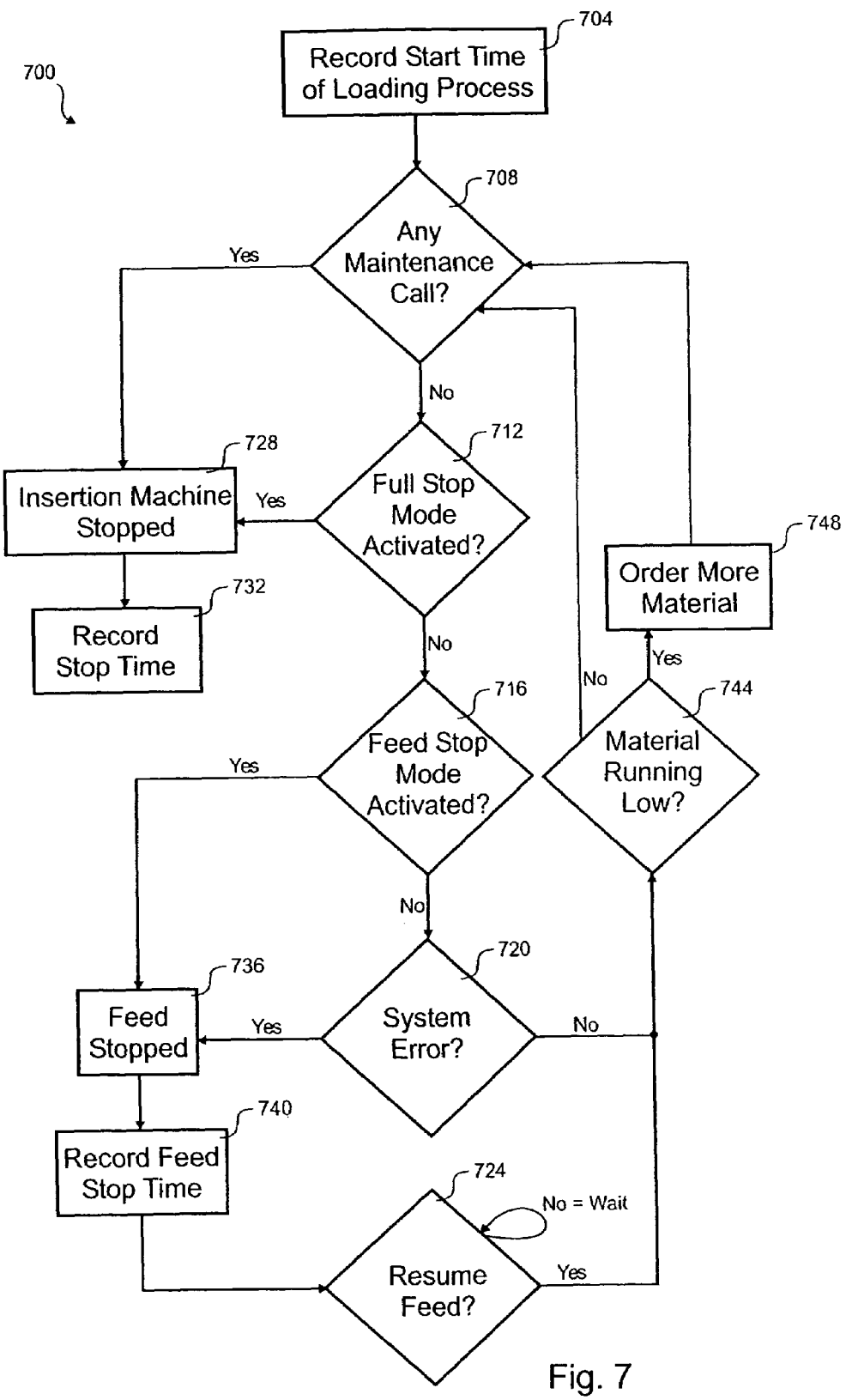
FIG. 7 is a flow diagram of an embodiment of a process for monitoring operation of the insertion machine and its operator.

Referring next to FIG. 7, a flow diagram of an embodiment of a process 700 for monitoring operation of the insertion machine and its operator is shown. Errors, low supplies, operator intervention, etc. can pause or stop the insertion machine 112 in various situations. The depicted portion of the process 700 begins in step 704 where the start time of the loading process is recorded in the local operator database 246. Insertion may continue for some time before interruption.

In step 708, the first type of interruption may be triggered that relates to a maintenance situation. If there is a maintenance situation, the insertion machine 112 is stopped in step 728. The stop time is recorded in the local operator database 246 in step 732. The maintenance situation could be recognized by the operator 108 or the control system 104. Examples of situations that could stop the machine 112 entirely include: a cam overload where the insertion machine 112 throws out its motor for the drive assembly; a broken track; or an empty piece inserter 276. Additional information may be requested of the operator 108 with forms and/or wizards to ease repair. If there is no maintenance situation, processing continues to step 712 where the operator can completely stop the machine in a break mode where both the feed and the drive for the insertion machine 112 are stopped. Where a break is initiated, the machine is stopped in step 728 and that stop is recorded in step 732. Break situations include, for example, shift changes, lunch breaks, etc.

In step 716, the operator 108 may interact with the interface function 304 to manually activate a feed stop mode or the control system 104 may automatically activate the feed stop mode upon detecting a system error in step 720. In this mode, the insertion machine 112 still operates, but the track feed is stopped in step 736. When the feed is stopped, the time of that stoppage is recorded in the local operator database 246 in step 740. In step 724, the operator 108 may resume the feed after fixing the issue that prompted the activation of feed stop mode.

After fixing the system error issue, processing continues to step 744 where the amount of material in each piece inserter 276 is analyzed. Where the material is running low with more envelopes to fill, more material can automatically be ordered from the job warehouse 124. Other embodiments may present the low material problem to the operator 108 to allow manual confirmation or manual ordering of the material. After any material supply problems are fixed, processing loops back to step 708 where the process begins over again.

Figure 8:
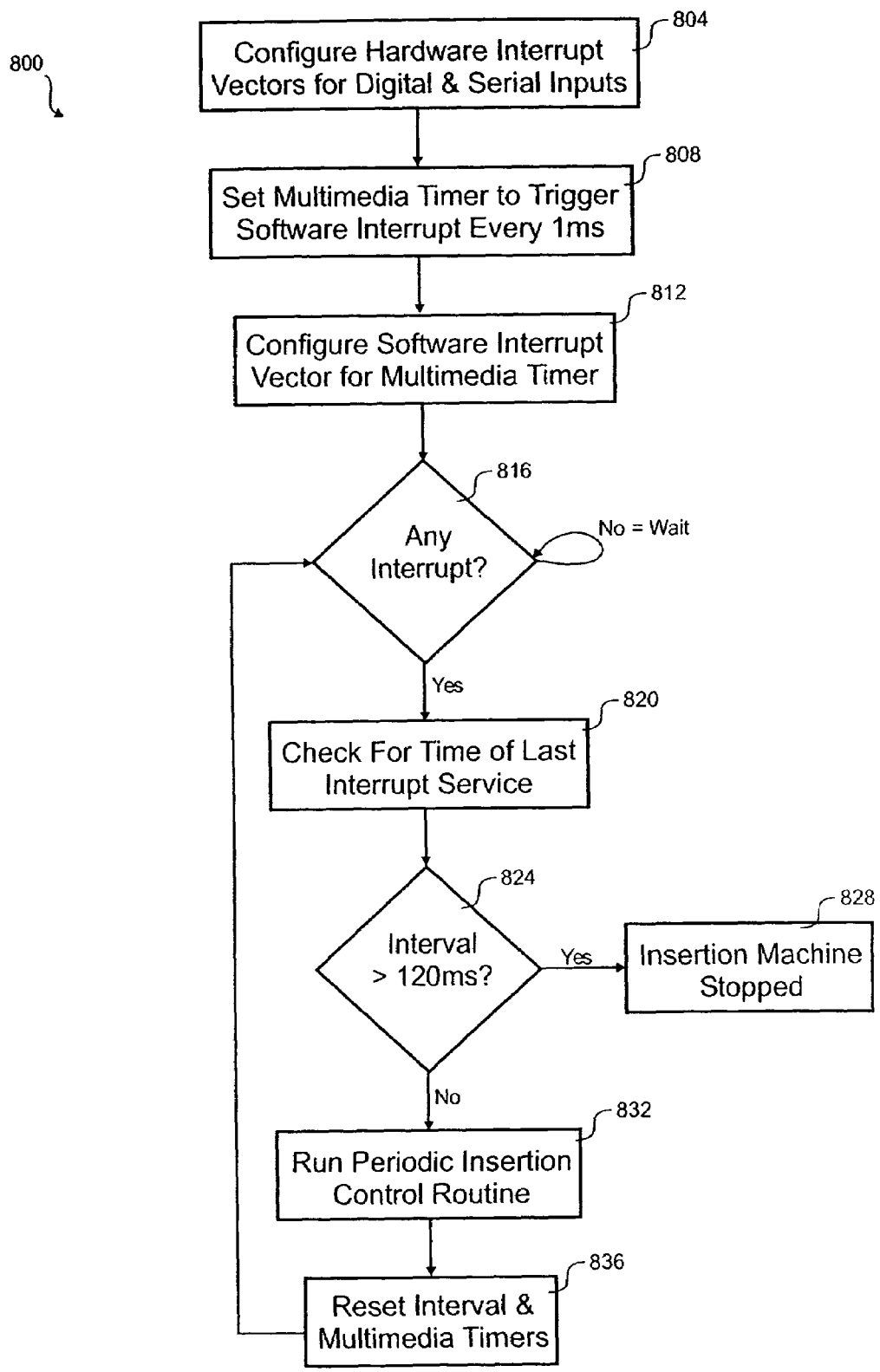
FIG. 8 is a flow diagram of an embodiment of a process for controlling operation of the insertion machine.

With reference to FIG. 8, a flow diagram of an embodiment of a process 800 for controlling operation of the insertion machine 112 at the software level is shown. This insertion control process 800 runs on a consumer-grade operating system and not a real-time operating system. The process 800 is encoded in the insertion control function 320 that runs in the application layer of the operating system and not in the driver layer or operating system layer. However, other embodiments could run on a real time operating system or different software layers.

The depicted portion of the process 800 begins in step 804 where the hardware interrupt vectors are configured. In this embodiment, the digital input card 208 has one interrupt and the serial input card 212 has another interrupt. Each digital input can trigger the interrupt when a digital value is presented or when there is a change in the digital value for that digital input. The serial input triggers the interrupt when one or more new data bytes are presented to the serial input card 212. Other embodiments could have a number of hardware interrupts for the digital input card 208 and the serial input card 212. The interrupt vector for each interrupt is configured to activate software that will service each interrupt in step 804. In this way, insertion control function 320 activates when any time one of the interrupts is triggered.

In step 808, a multimedia timer is set to trigger a software interrupt every millisecond. Other embodiments could use different types of timers and software interrupts of various priority. The interrupt vector for the software interrupt is configured in step 812 to activate the insertion control function 320 each time the timer expires. As is the case with software interrupts on a non-real time operating system, the expiration of the timer may not be recognized until some time after the actual expiration. The tasks checked from the software interrupt are also checked in relation to the hardware interrupts.

In step 816, the insertion process 436 is performed with the insertion control application 320 waiting for either of the hardware or software interrupts. When there is an interrupt processing continues to step 820 where a check is made of an interval timer that was reset during the last interrupt service. If the interval timer has exceeded 120 ms as determined in step 824, the insertion machine 112 is stopped in step 828. Where machine control has been unattended to for as long as 120 ms, a serious error is presumed. The operator 108 can diagnose the problem and request maintenance or restart processing. The interval timer is adjustable in various embodiments to, for example, account for different insertion machines 112 and speeds of operation.

Where the interval timer has not exceeded the 120 ms threshold, processing continues to step 832 where a periodic insertion control routine is performed. This routine may trigger actuators and solenoids, command subsystems, read the encoder 216, etc. as part of the machine control process. In step 836, the interval and multimedia timers are reset as the insertion control routine finishes its tasks. Once finished, the processing loops back to step 816 to wait for another interrupt and begin the loop portion over again.

A number of variations and modifications of the invention can also be used. For example, although some embodiments do not expressly state there are a number of insertion machines, it is to be understood that a number of machines may be run in parallel. These insertion machines all make requests to the job warehouse, maintenance request system and management system in parallel over the network.

While the principles of the invention have been described above in connection with specific apparatuses and methods, it is to be clearly understood that this description is made only by way of example and not as limitation on the scope of the invention.

What is claimed is:

1. A method for inserting pieces of printed material into an envelope with an insertion machine running an operating system, the method comprising steps of:

tracking a plurality of pieces of printed material through the insertion machine while it operates;

maintaining a record of the number of pieces of printed material and envelopes remaining within the insertion machine while it operates; and using the operating system, sending a request to a job warehouse to order additional pieces of printed material or envelopes when a threshold number of pieces of printed material or envelopes is reached.

2. A method as in claim 1, wherein the tracking step comprises correlating at least one of the pieces to a packet.

3. A method as in claim 1, further comprising at least one of the following steps:

tracking an operator's interaction with the insertion machine; and reporting maintenance issues for the insertion machine to a point away from the insertion machine.

4. A method as in claim 2, further comprising operating the inserter machine in a range of 3,000 to 20,000 packets per hour.

5. A method as recited in claim 3, further comprising storing information relating to an operator in a remote operator database.

\* \* \* \* \*